United States Patent [19]

Morino

[11] 4,258,587

[45] Mar. 31, 1981

[54] POWER TRANSMISSION UNIT FOR AN AUTOMOTIVE VEHICLE

[75] Inventor: Hideki Morino, Nagoya, Japan

[73] Assignee: Toyota Jidosha Kogyo Kabushiki Kaisha, Toyota, Japan

[21] Appl. No.: 877,767

[22] Filed: Feb. 14, 1978

[30] Foreign Application Priority Data

Feb. 14, 1977 [JP] Japan .................................. 52-14788

[51] Int. Cl.³ ............................................ F16H 37/08
[52] U.S. Cl. ...................................... 74/700; 74/694; 74/695
[58] Field of Search ................. 74/375, 700, 363, 357, 74/359, 360, 694, 695

[56] References Cited

U.S. PATENT DOCUMENTS

| | | | |
|---|---|---|---|
| 3,318,168 | 5/1967 | Castelet | 74/700 X |
| 3,799,000 | 3/1974 | Piret | 74/700 X |
| 4,056,988 | 11/1977 | Kubo et al. | 74/695 |

FOREIGN PATENT DOCUMENTS

1008116 10/1965 United Kingdom.
1084453 9/1967 United Kingdom.
1165859 10/1969 United Kingdom.

Primary Examiner—C. J. Husar
Assistant Examiner—Frank McKenzie
Attorney, Agent, or Firm—Cushman, Darby & Cushman

[57] ABSTRACT

A power transmission unit for an automotive vehicle having a clutch, a change speed gearing and a final drive compactly arranged with each other. A power output shaft of the clutch extends coaxially with a crankshaft of an engine. The change speed gearing has a main shaft and a counter shaft both disposed downwardly from and in parallel with the power output shaft. On the main and the counter shafts are carried change speed gear trains which are operatively coupled to the power output shaft of the clutch and are disposed downwardly rearwardly from the clutch. The final drive is arranged below the engine adjacent to the front end of the clutch. The final drive and the front end of the main shaft of the change speed gearing are connected through a drive pinion shaft which is disposed immediately below the clutch and extends coaxially with the main shaft. With the arrangement that the drive pinion shaft is disposed immediately below the large clutch, the entire unit is made compact.

5 Claims, 5 Drawing Figures

POWER TRANSMISSION UNIT FOR AN AUTOMOTIVE VEHICLE

The present invention relates to generally a power transmission unit for an automotive vehicle and more particularly to a compact arrangement of a clutch, a change speed gearing and a final drive suitable for use with a front-engine front-drive type and a rear-engine rear-drive type automotive vehicles.

Various types of power transmission units have been proposed for front-engine front-drive vehicles. For instance, British Patent No. 1,084,452 discloses a power transmission unit for a motor vehicle including a change-speed gearing having a layshaft and an associated mainshaft which is supported in a pair of axially spaced journal bearings, a disengageable coupling or clutch having a power input member for connection to the crankshaft of the vehicle engine and a power output member having a driving gear, the axes of the layshaft and mainshaft being parallel to and spaced from the axis of rotation of the disengageable coupling, the driving gear being arranged to drive a power input gear for the change-speed gearing through an intermediate idler gear, which power input gear is arranged between the said mainshaft journal bearings. British Patent No. 1,084,453 also discloses a propulsion plant for a motor road vehicle in which a change-speed gearing and a differential gearing, for driving a pair of independently-suspended road wheels, are supported from a reciprocating type internal combustion engine such that the differential gearing is below the engine crankshaft, a disengageable coupling is adapted to be connected to the engine to drive a power transmission shaft coaxial with the engine crankshaft and drivingly connected to a driving gear, the change-speed gearing has a layshaft with a layshaft gears for selectively driving respective complementary gears on a mainshaft which is connected to drive the power input member of the differential gearing, the mainshaft is supported by two axially spaced bearings, and a power input gear for the change-speed gearing is journalled on the mainshaft between said bearings to mesh with one of said layshaft gears and is arranged to be driven from the transmission shaft by said driving gear which is arranged in a housing that is fast with the housing of the change-speed gearing.

In both the transmission unit and propulsion plant of the types described above, the change-speed gearing is disposed immediately below the clutch which has a relatively large diameter so that the automotive vehicle is inevitably high. Since the differential gearing is disposed closer to the front of the vehicle, the wheel base becomes longer so that the weight distributed on the front wheels is reduced. As a result, the slippage of the front wheels tends to occur very often when the vehicle is ascending a grade, and the maneuverability and stability are adversely affected especially in case of turning.

Moreover because of the long wheel base, the minimum turning radius is increased, and the front overhang becomes shorter so that the fender and the front portion of the wheel arch may not sufficiently cover the front wheels, the bumber may not have sufficient strength and the design of the vehicle is not satisfactory.

There has been proposed a power transmission unit of another type which is disclosed in detail in Japanese Utility Model Publication No. 17877/1974, published May 10, 1974 based on application No. 120398/70 filed Dec. 4, 1970 for inventors Itoh et al. by the assignee hereof. In this transmission unit, the countershaft extends between the clutch output shaft and the main shaft, and both the main shaft and the counter shaft extend rearward from the engine. Since the differential gear assembly is disposed immediately below the clutch, the height of the engine above the ground is high. Furthermore the countershaft is extending rearward, the transmission case also extends rearward so that the usable inner dimensions of the vehicle compartment are reduced. This reduction in usable inner dimensions of the compartment is also caused by the fact that the front wheels are attached backwardly of the engine as the differential gear assembly is disposed backwardly of the engine as described above.

In view of the above, one of the objects of the present invention is to provide a power transmission unit for an automotive vehicle which may reduce the overall height of the vehicle.

Another object of the present invention is to provide a power transmission unit for an automotive vehicle which may be less extended rearward into the compartment so that the reduction in usable inner dimensions of the compartment may be avoided and the arrangement of various pedals within the compartment will not be adversely affected.

A further object of the present invention is to provide a power transmission unit for an automotive vehicle which may define a suitable wheel base and a sufficiently long front overhang so that the weight distributed on the wheels may be increased and consequently the grade ability or the hill-climbing ability as well as the maneuverability and stability may be improved, the minimum turning radius may be reduced and the design of the fender and its associated parts may be much facilitated.

In accordance with the present invention, there is provided a power transmission unit for an automotive vehicle comprising a disengageable coupling means having a power output shaft extending coaxially with and disengageably coupled to a crankshaft of an engine, a change speed gearing including a main shaft and a counter shaft both disposed downwardly from and in parallel with the power output shaft, and change speed gear trains carried on the main and counter shafts and arranged rearwardly downwardly from the coupling means, means for operatively coupling the power output shaft to the change speed gearing, a drive pinion shaft disposed immediately below the coupling means and having a front end and a rear end which is coupled to the main shaft, and a final drive including a drive pinion carried on the front end of the drive pinion shaft and a ring gear constantly in mesh with the drive pinion.

The above and other objects, features and advantages of the present invention will become more apparent from the following description of preferred embodiments thereof taken in conjunction with the accompanying drawings.

Same reference numerals are used to designate similar parts throughout the figures.

FIRST EMBODIMENT, FIGS. 1-3

Figure 1:
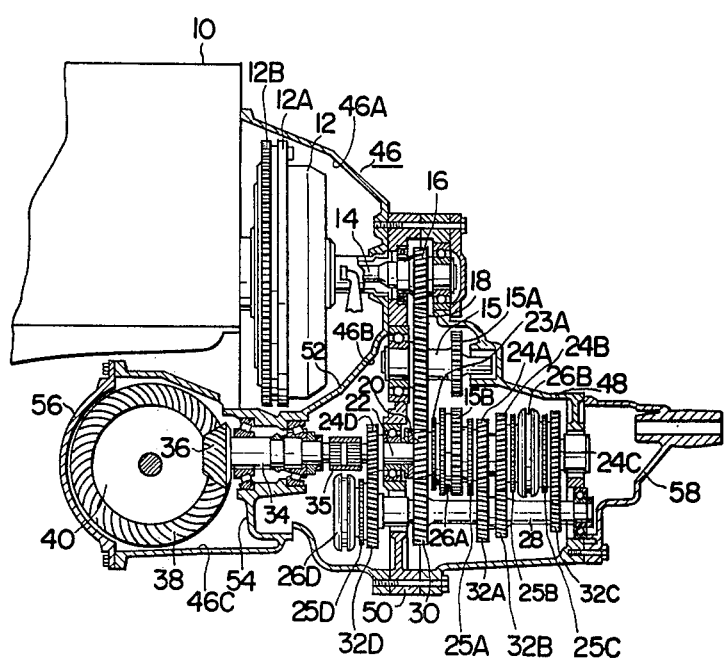
FIG. 1 is a sectional view in elevation of a first embodiment of a power transmission unit of the present invention.
Figure 2:
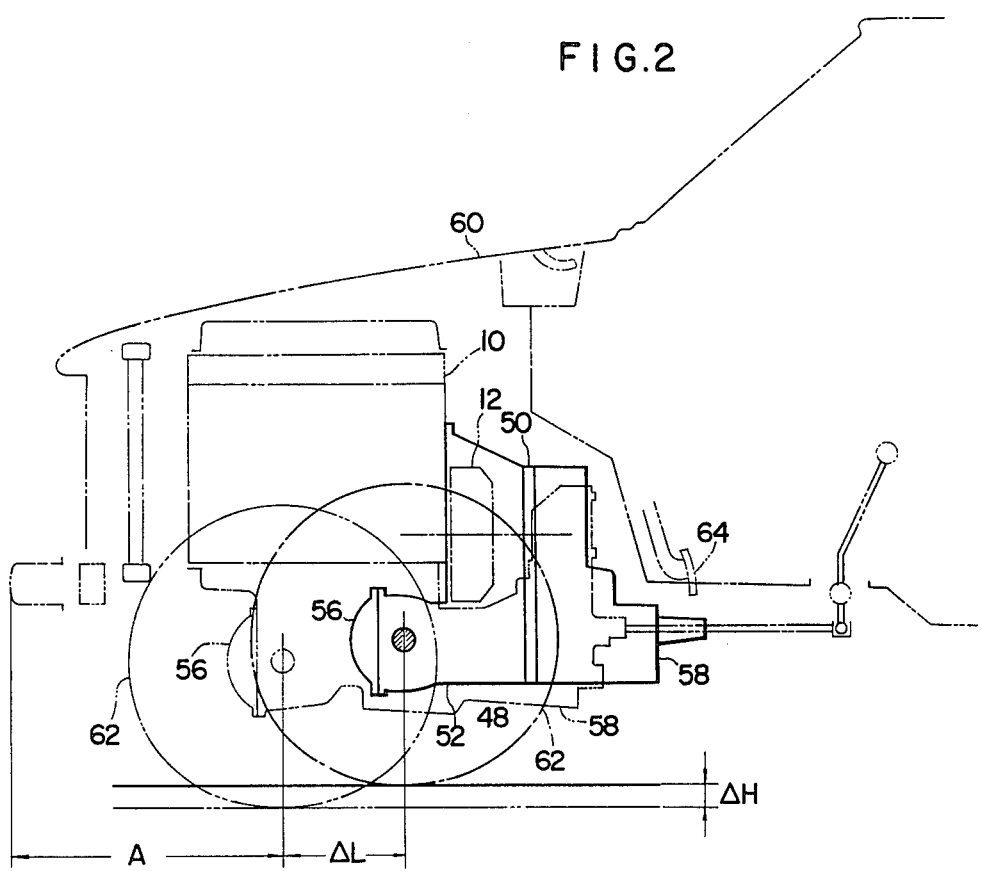
FIGS. 2 and 3 show the comparison in mounting on an automotive vehicle between the transmission unit in accordance with the present invention and the prior art transmission units.

Referring to FIG. 1, a crankshaft of an engine 10 is drivingly connected to a flywheel 12A formed integral with a starter ring gear 12B and a clutch 12 which is a disengageable coupling means and which has a clutch output shaft 14. The axis of the clutch 12 is in parallel with the longitudinal axis of an automotive vehicle.

An idler shaft 15 which is disposed below the clutch output shaft 14 in parallel therewith carries an idler gear 18 which is in constant mesh with a drive gear 16 carried by the clutch output shaft 14.

A main shaft 22 is disposed immediately below the idler shaft 15 and in parallel with the clutch output shaft 14 and the main shaft 22 carries an input gear 20 which is in constant mesh with the idler gear 18 and which is not keyed or splined to the main shaft 22 so that it idlely rotates on the main shaft 22. The main shaft 22 is extended rearward away from the engine 10 and the clutch 12 and carries a third speed gear 24A, a second speed gear 24B and a first speed gear 24C. A fifth-speed gear (or an overdrive gear) 24D is formed integral with the main shaft 22 at the front end thereof for rotation in unison therewith.

Synchronizing mechanisms 26A and 26B which constitute intertia type (Borg-Warner type) synchromesh mechanisms are interposed between the input gear 20 and the third speed gear 24A and between the second speed gear 24B and the first speed gear 24C. These synchronizing mechanisms 26A and 26B are keyed or splined to the main shaft 22 for slidable movement along the main shaft 22. Therefore in gear shafting the synchronizing mechanism 26A engages with either of a gear spline integral with the input gear 20 or a gear spline 25A formed integral with the third-speed gear 24A while the synchronizing mechanism 26B engages with either of a gear spline 25B formed integral with the second speed gear 24B or a gear spline 25C formed integral with the first speed gear 24C.

Each of the synchronizing mechanisms 26A and 26B is caused to engage with the corresponding gear spline after the speeds of the synchronizing mechanism and the gear spline have been synchronized by a synchronizing ring and shifting keys (not shown).

A countershaft 28 is disposed in parallel with the main shaft 22 and at the same height as the main shaft 22, but for the sake of simplicity in illustration the countershaft 28 is shown as being disposed below the main shaft 22 in FIG. 1. The countershaft 28 carries a countershaft drive gear 30 which is formed integral with the countershaft 28 and which is in constant mesh with the input gear 20 which rotates idlely on the main shaft 22. The countershaft 28 further carries a countershaft third-speed gear 32A in constant mesh with the main shaft third speed gear 24A, a countershaft second speed gear 32B in constant mesh with the main shaft second speed gear 24B and a countershaft first speed gear 32C in constant mesh with the main shaft first speed gear 24C. The countershaft 28 further carries a countershaft fifth speed gear 32D which is not keyed or splined to the countershaft 28 and is in constant mesh with the main shaft fifth speed gear 24D and is formed integral with a gear spline 25D.

A synchronizing mechanism 26D is splined to the countershaft 28 for slidable movement therealong for engagement with the gear spline 25D of the fifth speed gear 32D, whereby the rotation of the countershaft 28 is transmitted to the main shaft 22.

The front end of the main shaft 22 is connected through a spline joint 35 to the rear end of a drive pinion shaft 34 which is extended below the clutch 12 and which carries a drive pinion 36 at the front end. The drive pinion 36 is made in constant mesh with a ring gear 38 which in turn is drivingly coupled to a differential gear assembly 40 which in turn is coupled to front axles (not shown) so as to drive front wheels (not shown). The drive pinion 36 and the ring gear 38 constitute a final drive.

A casing for enclosing the power transmission unit with the construction described above consists of a transaxle case 46, a transmission case 48 and an intermediate plate 50 sandwiched between the cases 46 and 48.

The case 46 defines a first chamber 46A for enclosing the clutch 12, the flywheel 12A and the starter ring gear 12B, a second chamber 46B enclosing the fifth speed gearing and a third chamber 46C for enclosing the final drive (the drive pinion 36 and the ring gear 38) and the differential gear assembly 40.

The first chamber 46A is securely fixed to the cylinder block of the engine 10 with bolts (not shown), whereby the case 46 is firmly attached to the engine 10. The intermediate plate 50 is attached to the rear end face of the first chamber 46A. The second chamber 46B is defined below the first chamber 46A and is partitioned therefrom by a partition wall 52. The rear end opening of the second chamber 46B is closed by the intermediate plate 50. The third chamber 46C is defined frontward of the second chamber 46B and is separated therefrom by a partition wall 54. In other words the third chamber 46C is extended in the form of a cantilever below the engine 10 and is spaced apart therefrom by a suitable small distance. The front opening end of the third chamber 46C is closed with a cover 56.

The transmission case 48 is securely mounted with a plurality of bolts on the transmission axle case 46 with the intermediate plate 50 interposed therebetween. The free end of the clutch output shaft 14 is supported by the intermediate plate 50, and the idler shaft 15, the main shaft 22 and the countershaft 28 are supported between the intermediate plate 50 and the transmission case 48. The main shaft cluster of gears and the countershaft cluster of gears are enclosed within the space defined by the intermediate plate 50 and the transmission case 48.

An extension housing 58 is joined to the rear end of the transmission case 48 and supports a gearshift lever (not shown).

Next the mode of operation of the first embodiment of the present invention with the above construction will be described. In the neutral position, the power is transmitted from the clutch output shaft 14 to the countershaft 28 through the idler gear 18, the input gear 20 and the countershaft drive gear 30, whereby the pairs of third, second and first speed gears are rotated but no power is transmitted to the main shaft 22.

In shifting from the neutral position to the first speed position, the second synchronizing mechanism 26B on the main shaft 22 is caused to slide rearward for engagement with the gear spline 25C so that the main shaft first speed gear 24C is locked to the main shaft 22, whereby the power is transmitted to the main shaft 22 and consequently to the final drive (the drive pinion 36 in mesh with the ring gear 38). In like manner the gearshift to the second, third or fifth speed position may be accomplished.

In the fourth gear position, the first synchronizing mechanism 26A is moved to the left and engaged with the gear spline 23A of the input gear 20, whereby the input gear 20 is locked to the main shaft 22.

In reverse drive, an idle gear 15A carried by the idler shaft 15 is brought into mesh with a reverse gear 15B formed integral with the synchronizing mechanism 26A through an idle gear (not shown).

Next the mode of assembly will be described. The idler shaft 18, the main shaft 22 and the countershaft 28 are attached with the gears and bearings at both ends. Each shaft is held vertically such that the lower bearing may be fitted into a corresponding bearing hole in the intermediate plate 50 which is maintained horizontally. After the lower bearings of the idle, main and countershafts 18, 22 and 28 have been fitted into the corresponding bearing holes in the intermediate plate 50, the upper bearings are fitted into the corresponding bearing holes in the transmission case 48. Thereafter the subassembly consisting of the transmission case 48, the intermediate plate 50 and the idle, main and counter shafts 18, 22 and 28 is attached with the bolts to the rear end face of the transmission axle case 46 which is mounted on the cylinder block of the engine 10.

Therefore it is apparent that the intermediate plate 50 may greatly simplify and facilitate the assembly. Furthermore in case of a transmission trouble, only the transmission may be readily removed. Furthermore when the automotive vehicle is ascending or descending a grade, the transmission unit is tilted, but the intermediate plate 50 effectively serves to prevent the flow of the lubrication oil from the transmission case 48 into the second chamber 46B or vice versa. Moreover, the intermediate plate 50 may serve to increase the rigidity of the transmission unit and to suppress the noise and vibration transmitted to the compartment.

Figure 3:
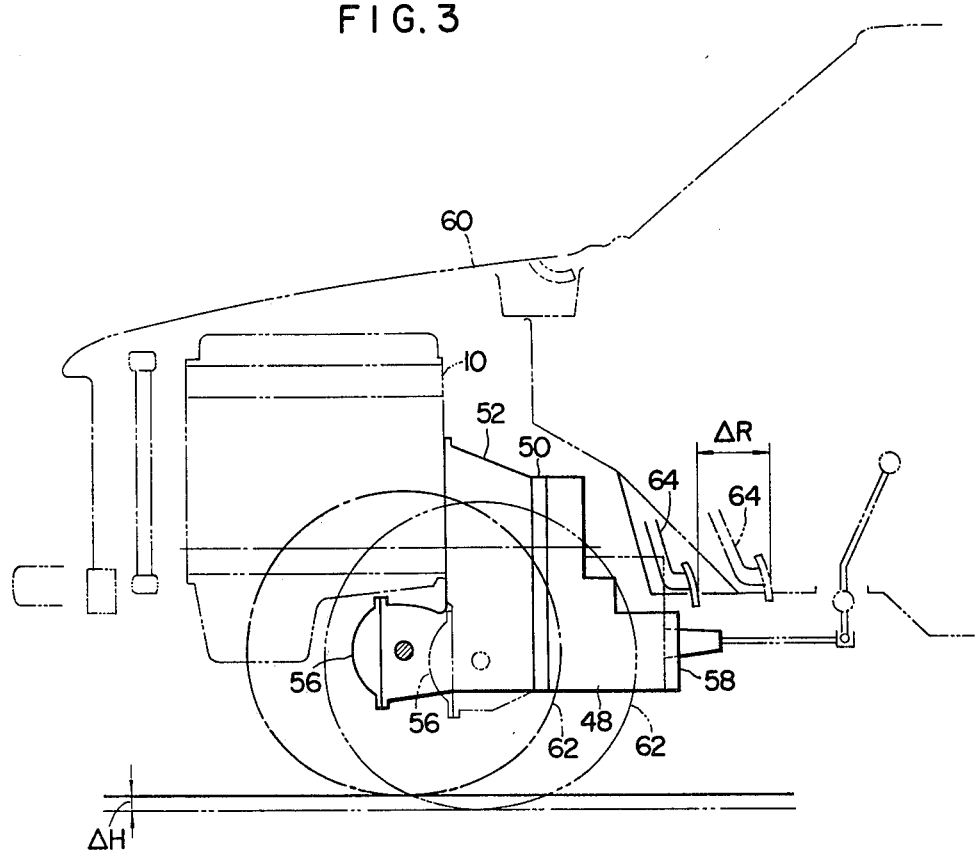

In FIG. 3 there is shown the power transmission unit mounted on an automotive vehicle generally indicated by the reference numeral 60. From the comparison with the prior art power transmission unit of the type described in the above British patents and indicated by the two-dot chain lines, it is apparent that the transmission unit in accordance with the present invention is very advantageous. That is, according to the present invention, only the main shaft 22 or the drive pinion shaft 34 is disposed immediately below the clutch 12 which has relatively a large diameter, while in the prior art transmission unit the transmission gears are disposed below the clutch. As a result, the height of vehicle in accordance with the present invention may be reduced by ΔH as compared with the vehicle equipped with the prior art power transmission unit.

Furthermore according to the present invention the transmission gears are disposed backwardly of the input gear 20 so that the final drive and the differential gear assembly 40 may be disposed immediately below the engine 10 adjacent to the rear end thereof. As a result, as compared with the automotive vehicle having the prior art power transmission unit, the wheel base may be reduced ΔL, and the front wheels 62 may bear more distributed weight of the vehicle 60 so that the slippage of the front wheel when the car is ascending a grade may be eliminated, the maneuverability and stability especially in case of turning may be remarkably improved and the minimum turning radius may be reduced.

Moreover the front overhang A may be considerably increased so that a front fender may be so designed and constructed as to sufficiently cover the front wheels 62 and the fender as well as its associated parts may be improved in mechanical strength.

FIG. 3 illustrates the advantages of the transmission unit in accordance with the present invention over the prior art power transmission unit of the type described in the above Japanese Utility Model Publication and indicated by the two-dot chain lines. Since the final drive as well as the differential gear assembly 40 of the prior art transmission unit are disposed immediately below the clutch 12 which has a relatively large diameter, the height of the transmission unit is high, and the front wheels 62 must be attached backwardly of the engine 10 so that a pedal 64 must be displaced backwardly by ΔR, as compared with the unit of the invention. Consequently the usable interior dimensions of the compartment are decreased. Furthermore the countershaft 28 is further extended backward so that the usable interior dimensions of the compartment are further reduced.

In the first embodiment, the clutch output shaft 14 has been described as being drivingly coupled through the idle gear 18 to the main shaft drive gear 20, but it is to be understood that the clutch output shaft 14 may be drivingly coupled to the input gear 20 through any suitable transmission mechanisms such as a combination of a chain and sprocket wheels. Furthermore, instead of the four speed transmission the transmissions having any number of speeds may be used.

SECOND EMBODIMENT, FIG. 4

Figure 4:
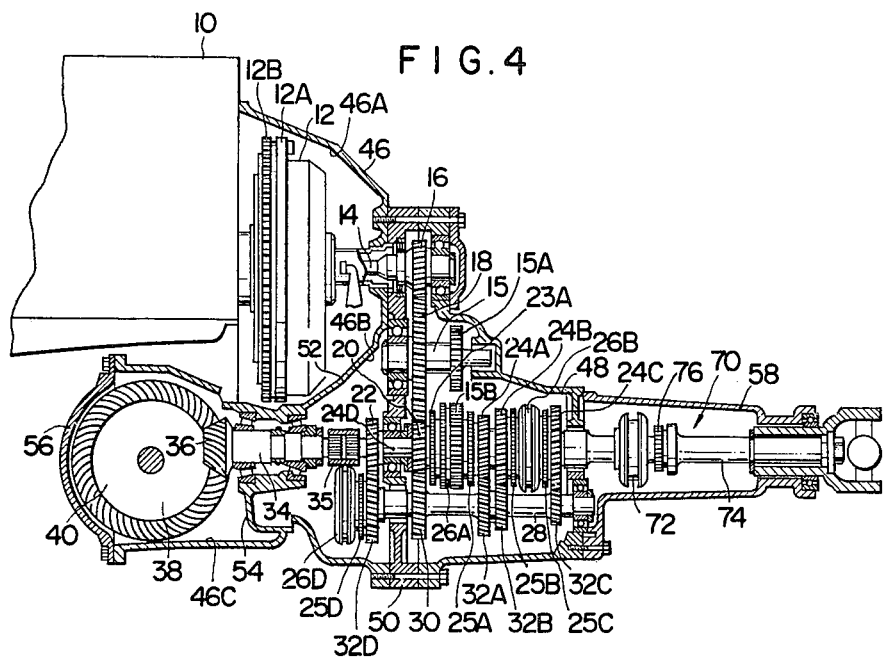
FIG. 4 is a sectional view in elevation of a second embodiment of the present invention.

The second embodiment of the present invention shown in FIG. 4 is substantially similar in construction to the first embodiment described above except that a power transfer means generally designated by the reference numeral 70 is disposed within the extension housing 58 for four-wheel drive. The power transfer means 70 consists of a sleeve 72 splined to the main shaft 22 and a connecting rod 74 which in turn is connected drivingly to a propeller shaft connected to rear wheels. When the sleeve 72 is brought into engagement with splines 76 of the connecting rod 74, the power is transmitted not only to the front wheels but also to the rear wheels.

THIRD EMBODIMENT, FIG. 5

Figure 5:
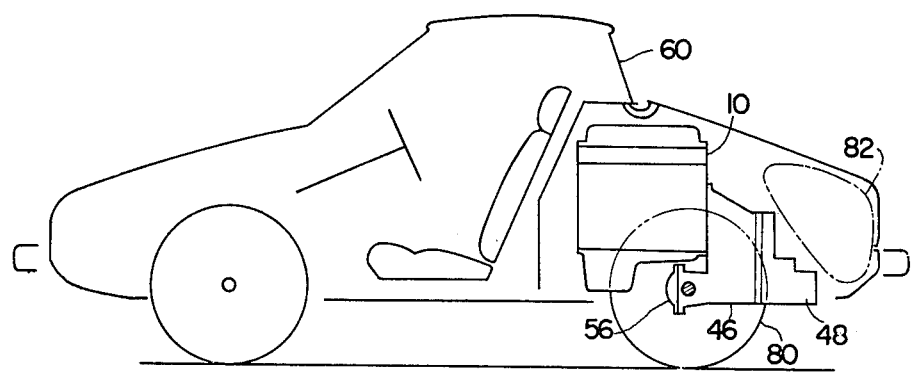
FIG. 5 is a schematic view illustrating a third embodiment of the present invention.

In the third embodiment shown in FIG. 5, the engine 10 and the power transmission unit are mounted on the automotive vehicle 60 nearly at the midpoint between the front and rear ends for driving the rear wheels 80. This type of the engine mounting is called the midship type engine. As in the first embodiment, the height of the automotive vehicle 60 may be reduced, and the space indicated by 82 adjacent to the rear end may be advantageously utilized.

What is claimed is:

1. A power transmission unit for an automotive vehicle having an engine, said unit comprising:
   a disengageable coupling means having a power output shaft extending coaxially with and disengageably coupled to a crankshaft of an engine;
   a change speed gearing including a main shaft and a counter shaft both disposed downwardly from and in parallel with said power output shaft, and change speed gear trains carried on said main and counter shafts and arranged rearwardly downwardly from said coupling means;

said counter shaft being disposed in parallel with and spaced laterally from said main shaft;

means for operatively coupling said power output shaft to said change speed gearing;

said operatively coupling means including:
- a drive gear integrally mounted on said power output shaft,
- an idler shaft disposed below said power output shaft,
- an idler gear mounted on said idler shaft and being in constant mesh with said drive gear,
- an input gear mounted on said main shaft below said idler shaft and being in constant mesh with said idler gear, and
- a counter shaft drive gear mounted on said counter shaft and being in constant mesh with said input gear;

a drive pinion shaft disposed immediately below said disengageable coupling means and having a front end and having a rear end which is coupled to said main shaft; and a final drive including a drive pinion carried on said front end of said drive pinion shaft and a ring gear constantly in mesh with said drive pinion, said final drive being disposed below said engine adjacent to the front end of said disengageable coupling means;

said drive gear, said idler gear, said input gear and said counter shaft drive gear all lying in the same transverse plane, said change speed gear trains being disposed rearwardly from said transverse plane.

2. A power transmission unit as set forth in claim 1, wherein said final drive is operatively coupled to a differential gear assembly for front wheels for front-wheel drive.

3. A power transmission unit as set forth in claim 1, wherein said final drive is operatively coupled to a differential gear assembly for rear wheels for rear-wheel drive.

4. A power transmission unit as set forth in claim 3, further comprising power transfer means operatively disengageably coupled to the rear end of said main shaft of said change speed gearing for four-wheel drive.

5. A power transmission unit for an automotive vehicle having an engine, said unit comprising:

a disengageable coupling means having a power output shaft extending coaxially with and disengageably coupled to a crankshaft of an engine;

a change speed gearing including a main shaft and a counter shaft both disposed downwardly from and in parallel with said power output shaft, and change speed gear trains carried on said main and counter shafts and arranged rearwardly downwardly from said coupling means;

said counter shaft being disposed in parallel with and spaced laterally from said main shaft;

means for operatively coupling said power output shaft to said change speed gearing;

said operatively coupling means including:
- a drive gear integrally mounted on said power output shaft,
- an idler shaft disposed below said power output shaft,
- an idler gear mounted on said idler shaft and being in constant mesh with said drive gear,
- an input gear mounted on said main shaft below said idler shaft and being in constant mesh with said idler gear, and
- a counter shaft drive gear mounted on said counter shaft and being in constant mesh with said input gear;

a drive pinion shaft disposed immediately below said disengageable coupling means and having a front end and having a rear end which is coupled to said main shaft; and a final drive including a drive pinion carried on said front end of said drive pinion shaft and a ring gear constantly in mesh with said drive pinion, said final drive being disposed below said engine adjacent to the front end of said disengageable coupling means;

said drive gear, said idler gear, said input gear and said counter shaft drive gear all lying in the same transverse plane, said change speed gear trains including a fifth speed gear mounted on said main shaft ahead of said transverse plane and a fifth speed gear mounted on said counter shaft ahead of said transverse plane.

* * * * *